US008695574B2

(12) United States Patent
Nguyen

(10) Patent No.: US 8,695,574 B2
(45) Date of Patent: Apr. 15, 2014

(54) INTAKE MANIFOLD HAVING AN INTEGRATED CHARGE AIR COOLER

(75) Inventor: Chi-Duc Nguyen, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/482,611

(22) Filed: May 29, 2012

(65) Prior Publication Data

US 2012/0285423 A1 Nov. 15, 2012

Related U.S. Application Data

(63) Continuation of application No. PCT/EP2010/068227, filed on Nov. 25, 2010.

(30) Foreign Application Priority Data

Nov. 26, 2009 (DE) ........................ 10 2009 055 715

(51) Int. Cl.
*F02M 15/00* (2006.01)

(52) U.S. Cl.
USPC .......................................... 123/540; 123/542

(58) Field of Classification Search
USPC .................................................. 123/540, 542
See application file for complete search history.

(56) References Cited

U.S. PATENT DOCUMENTS 4,436,145 A * 3/1984 Manfredo et al. .............. 165/67
5,097,891 A * 3/1992 Christensen .................... 165/41
5,566,748 A * 10/1996 Christensen .................... 165/67
5,570,738 A * 11/1996 Christensen .................... 165/67
6,029,345 A * 2/2000 Christensen ............... 29/888.01
6,182,744 B1 * 2/2001 Nakamura et al. ............ 165/140
7,347,248 B2 * 3/2008 Kolb et al. ....................... 165/42
7,464,700 B2 * 12/2008 Kolb ............................. 123/563
8,016,025 B2 9/2011 Brost et al.
2006/0272621 A1 * 12/2006 Acuna et al. .................. 123/542
2007/0114013 A1 * 5/2007 Augenstein et al. .......... 165/174
2007/0175617 A1 * 8/2007 Brost et al. .................... 165/149

(Continued)

FOREIGN PATENT DOCUMENTS

DE 10 2005 053 924 A1 5/2007
DE 10 2007 030 464 A1 1/2009
EP 2 014 892 A1 1/2009

OTHER PUBLICATIONS

David Scott, Bolts and Pins; An explanation of their differences, Jun. 2011, Technical Paper No. 1, All.*

(Continued)

*Primary Examiner* — Lindsay Low
*Assistant Examiner* — Charles Brauch
(74) *Attorney, Agent, or Firm* — Muncy, Geissler, Olds & Lowe, P.C.

(57) ABSTRACT

An intake manifold is provided that includes an integrated charge air cooler and a housing having a first housing part and a second housing part connected thereto. The charge air flows into the housing via an inlet and flows out of the housing via an outlet. The charge air cooler is disposed in the housing and is permeated by the charge air on the path from the inlet to the outlet. Also, the charge air cooler is completely enclosed by the housing, except for passages for passing a cooling fluid, and the charge air cooler is elastically supported relative to the housing by at least one elastic bearing element in particular disposed on a collector of the charge air cooler.

20 Claims, 6 Drawing Sheets

1a
4
8
1c
9
12
5
11
10
1d
6
2
1b
1

(56) References Cited

U.S. PATENT DOCUMENTS

2007/0181105 A1* 8/2007 Bazika .......................... 123/563
2009/0014153 A1* 1/2009 Pimentel et al. ................ 165/67
2009/0056922 A1* 3/2009 Hemminger et al. ......... 165/158
2010/0083941 A1* 4/2010 Kardos ......................... 123/542
2010/0096101 A1* 4/2010 Braun et al. .................... 165/41

OTHER PUBLICATIONS

Enerpac, Bolting Theory, All.*

* cited by examiner

INTAKE MANIFOLD HAVING AN INTEGRATED CHARGE AIR COOLER

This nonprovisional application is a continuation of International Application No. PCT/EP2010/068227, which was filed on Nov. 25, 2010, and which claims priority to German Patent Application No. DE 10 2009 055 715.6, which was filed in Germany on Nov. 26, 2009, and which are both herein incorporated by reference.

BACKGROUND OF THE INVENTION

1. Field of the Invention

The invention concerns an intake manifold with an integrated charge air cooler.

2. Description of the Background Art

From the practice of motor vehicle construction, proposals are known for integrating charge air coolers into an intake manifold of an internal combustion engine, wherein the charge air cooler is cooled indirectly, which is to say with coolant flowing through it. It is customary in this context to provide the charge air cooler with a flange plate, so that it can be inserted in an opening of an intake manifold housing in the manner of a plug-in unit and the edge of the flange plate can be screwed or welded to the housing. With this type of construction, vibrations or thermally caused distortions are transmitted directly to the charge air cooler via the flange plate.

SUMMARY OF THE INVENTION

It is therefore an object of the invention to provide an intake manifold with an integrated charge air cooler, in which the charge air cooler is especially well protected from vibrations and distortions.

Because the charge air cooler is essentially fully enclosed by the housing, it can be accommodated in the housing in a sufficiently damped manner. The required feed-throughs for the coolant have a relatively small cross-sectional area and can be sealed with respect to the housing by suitable devices such that no significant forces from vibrations or thermal distortions are transmitted to the charge air cooler. In accordance with the invention, the charge air cooler is elastically supported with respect to the housing. In this way, vibrations that are first transmitted from the internal combustion engine to the housing are damped with respect to the charge air cooler, or the charge air cooler and the intake manifold housing are decoupled. In accordance with the invention, the support is accomplished by means of at least one elastic support member, which is located on a header of the charge air cooler in a detailed design that is preferred but not required. The support member may be composed of a block of an elastic material such as rubber or the like, for example, but this is not required. For example, fastening to the header can take place by means of clamping, possibly by means of a flexible tab of the header. The arrangement of the support member on the header has in particular the advantage that the support forces act on structures that are relatively insensitive mechanically.

In general, charge air within the meaning of the invention is understood to mean the gas supplied to the internal combustion engine, and in this sense also includes any desired mixtures of air and exhaust gas if exhaust gas recirculation is provided. The intake manifold in accordance with the invention can be combined with diesel engines as well as with gasoline engines.

In an embodiment of the invention, the charge air cooler has essentially the shape of a cuboid, wherein the charge air cooler can be inserted in one of the housing parts perpendicular to the largest side surface of the cuboid. This simplifies assembly of the intake manifold. In a detailed design that is preferred but not required, the charge air cooler is inserted from above.

It is advantageous in general for the charge air cooler of an intake manifold in accordance with an embodiment of the invention to be designed as a tube heat exchanger with a stack of flat tubes, wherein the coolant flows through the flat tubes and the charge air flows around them. Such construction offers high cooling performance with low weight and a small installation space. In a preferred detail design in this regard, one header is located at each end of the flat tubes, wherein the flat tubes and the headers are manufactured as a soldered block from metal, preferably aluminum. In addition to the simple and economical manufacture, there are no seals between the coolant region and the charge air region in such a construction, so that the danger of a water hammer is reduced. In another preferred detail design, at least one of the headers has a base region and a header wall that are produced together as one piece from a formed sheet metal part. This reduces both the manufacturing costs and the number of soldered joints, resulting in an especially low reject rate. For example, it is possible to make a header from only three parts, namely the formed sheet metal part and two cover parts, and in another embodiment from five parts, namely the formed sheet metal part and a total of four cover parts.

In another preferred detail design, the tube bundle includes at least two rows of tubes in a depth direction, so that multiple flow paths are available for the coolant and the heat exchanger performance can be optimized for a given installation space. In a preferred embodiment, the rows of tubes can includes separate flat tubes, and in an alternative preferred embodiment can include a one-piece flat tube with separate flow passages. Such a one-piece flat tube can be manufactured as an extruded part, for example. Furthermore, it is preferred for the coolant to flow through the rows of tubes sequentially in opposite directions, in particular in a counterflow configuration with regard to the direction of flow of the charge air. This optimizes the heat exchanger performance for a given installation space. In addition, in the case of a two-row heat exchanger with a redirection region at the end, for example, both coolant connections can be provided on the same header.

In one possible embodiment of the invention, at least one side part is arranged on the charge air cooler, wherein the side part has a structuring for producing a labyrinth seal with respect to an inside wall of the housing. By this means, a leakage flow of the charge air between the charge air cooler and the housing wall is prevented in a simple way. A labyrinth seal is effective even if the housing wall forms bulges or similar deformations as a result of temperature variations. An elastomer seal can optionally be provided in addition to the labyrinth seal.

In another embodiment, at least two support members are connected to one another via a coupling link. This makes installation easier and ensures retention of the support elements on the charge air cooler, either by itself or as an additional measure. In one preferred detail design, the coupling link has a sealing member to seal the charge air cooler with respect to the housing, so that sealing against such occurrences as leakage flows of the charge air around the charge air cooler can be accomplished at the same time.

It is advantageous in general for a header of the charge air cooler to have an overhang extending in the flow direction of the charge air beyond an inlet plane or outlet plane of a cooler network. For instance, this form can produce improved or simplified sealing against leakage flows of the charge air, for example between the header and a housing wall. In particular, it is preferred for the overhang to be provided with a sealing member and/or to form a support for a sealing member.

Depending on the requirements, the housing can be made of a plastic or a light metal, for example based on aluminum.

It is preferred for an engine flange for attachment to an intake region of a cylinder head to be provided at the outlet of the housing, wherein the engine flange preferably can be made of plastic or a light metal in accordance with requirements. For optimizing the costs, provision can be made for the engine flange to be made of light metal while the housing of the intake manifold is made of a plastic, for example. In this case the engine flange and housing are fastened together as separate parts, for example by means of threaded fittings. If the engine flange and housing are made of the same material, such as plastic or aluminum, they can be designed as a single piece of uniform material. A single-piece design with uniform material also includes the case in which, for structural reasons, the housing and engine flange are prefabricated from plastic and are then welded together as separate parts, for example by means of ultrasonic welding. Alternatively thereto, the engine flange can be molded with the housing in a single casting operation if the shape allows for this in casting.

In another embodiment, a coolant connection of the charge air cooler is elastically sealed in an airtight manner to the housing in the region of the feed-throughs. The elastic sealing reduces the transmission of distortions and vibration from the housing to the charge air cooler.

In generally advantageous manner, provision can be made for at least one coolant connection of the charge air cooler to be joined material-to-material with the charge air cooler, in a preferred detail design by means of soldering, and/or for at least one coolant connection of the charge air cooler to be joined in an interlocking manner with the charge air cooler, in a preferred detail design by means of threaded fittings and/or clips.

In an embodiment, at least one coolant connection of the charge air cooler is provided on a top side of the charge air cooler with respect to gravity. In this way, additional venting openings can be eliminated, since venting of the charge air cooler takes place automatically through its coolant connections.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
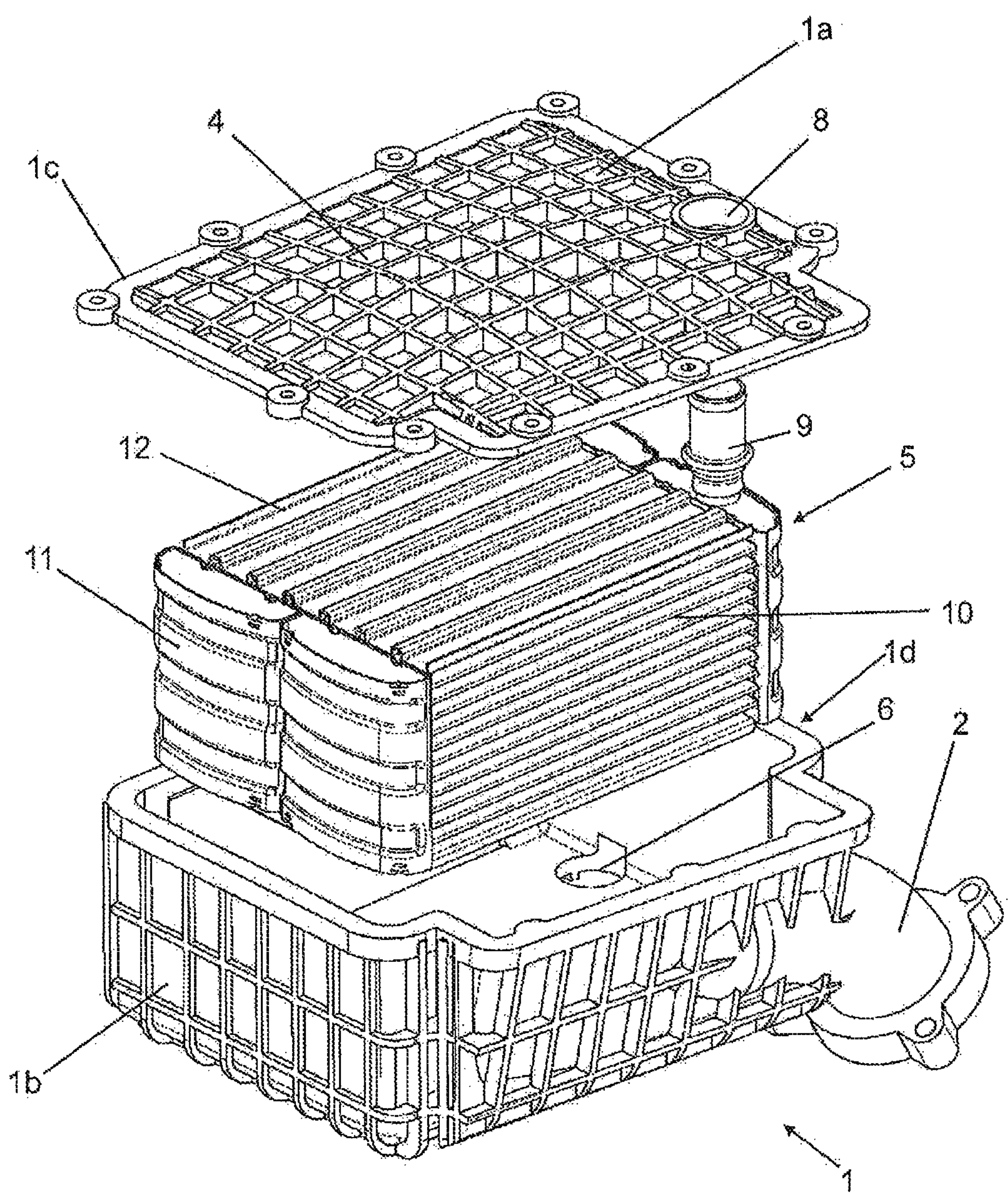
FIG. 1 shows an exploded three-dimensional view of an intake manifold with an integrated charge air cooler according to the invention.

The intake manifold according to the invention shown in FIG. 1 comprises an outer housing 1 made of plastic, which comprises a bottom housing part la and a top housing part 1*b*. The bottom housing part 1*a* encloses the majority of the volume of the housing interior, and has an inlet 2 in the form of a tubular flange for connection to a charge air duct and an outlet 3 in the form of a rectangular opening that extends over the majority of one side wall.

The second, top housing part 1*b* is designed essentially in the shape of a flat cover with rib structures 4 provided for reinforcement. Reinforcing rib structures 4 are also located over all side walls of the bottom housing part 1*a*.

The installation position of the housing 1 relative to an internal combustion engine that is not shown corresponds essentially to the position in FIG. 1. The parting plane between the housing parts 1*a*, 1*b* extends essentially horizontally. A charge air cooler 5 installed in the housing has essentially a cuboid shape that is essentially enclosed by the interior space of the housing 1 present between the housing parts la, 1*b*. The largest side area of the cuboid extends horizontally and parallel to the parting plane between the housing parts 1*a*, 1*b*. As FIG. 1 shows, the charge air cooler 5 can be inserted in the bottom housing part 1*a* perpendicular to the largest side area of the cuboid. Here, the orientation relative to the perpendicular relates to the installation position in the motor vehicle. It is a matter of course that the preassembly of the parts before installation in the motor vehicle can also take place in another spatial orientation. In the example according to FIG. 1, the two housing parts 1*a*, 1*b* are screwed together in a sealing manner along an edge 1*c* that is provided with holes. Alternatively, the parts can also be permanently welded or glued together.

In order to avoid lateral leakage flow of the charge air, sides of the charge air cooler implemented as headers 11, 14 are embedded in convex projections 1*d* of the housing part 1*a*, which projections form an undercut with respect to the housing in the region of the inlet 2. Moreover, additional sealing devices that are not shown in FIG. 1 and FIG. 2 can be provided between the headers 11, 14 and the side walls of the housing part 1*a* or convex projections 1*d*; see the variation in FIG. 3 through FIG. 5, for example.

A first feed-through 6 for accommodating an inlet connection fitting 7 (see FIG. 2) for a coolant of the charge air cooler 5 is located in a bottom side of the bottom housing part 1*a*. A second feed-through 8 for an outlet connection fitting 9 of the charge air cooler 5 is located in the cover-like top housing part 1*b*. The connection fitting 9 is located on a top side of the charge air cooler 5, so that no additional venting bores are provided on the charge air cooler 5. Venting of the charge air cooler 5 with respect to the coolant flowing through it takes place without difficulty in the installed state and in operation through the upper coolant connection 9.

The charge air cooler 5 is designed entirely as a soldered block from aluminum parts. In a known manner, at least some of the parts are solder-plated on one or both sides and are soldered in a soldering furnace after mechanical preassembly and fixturing.

Figure 2:
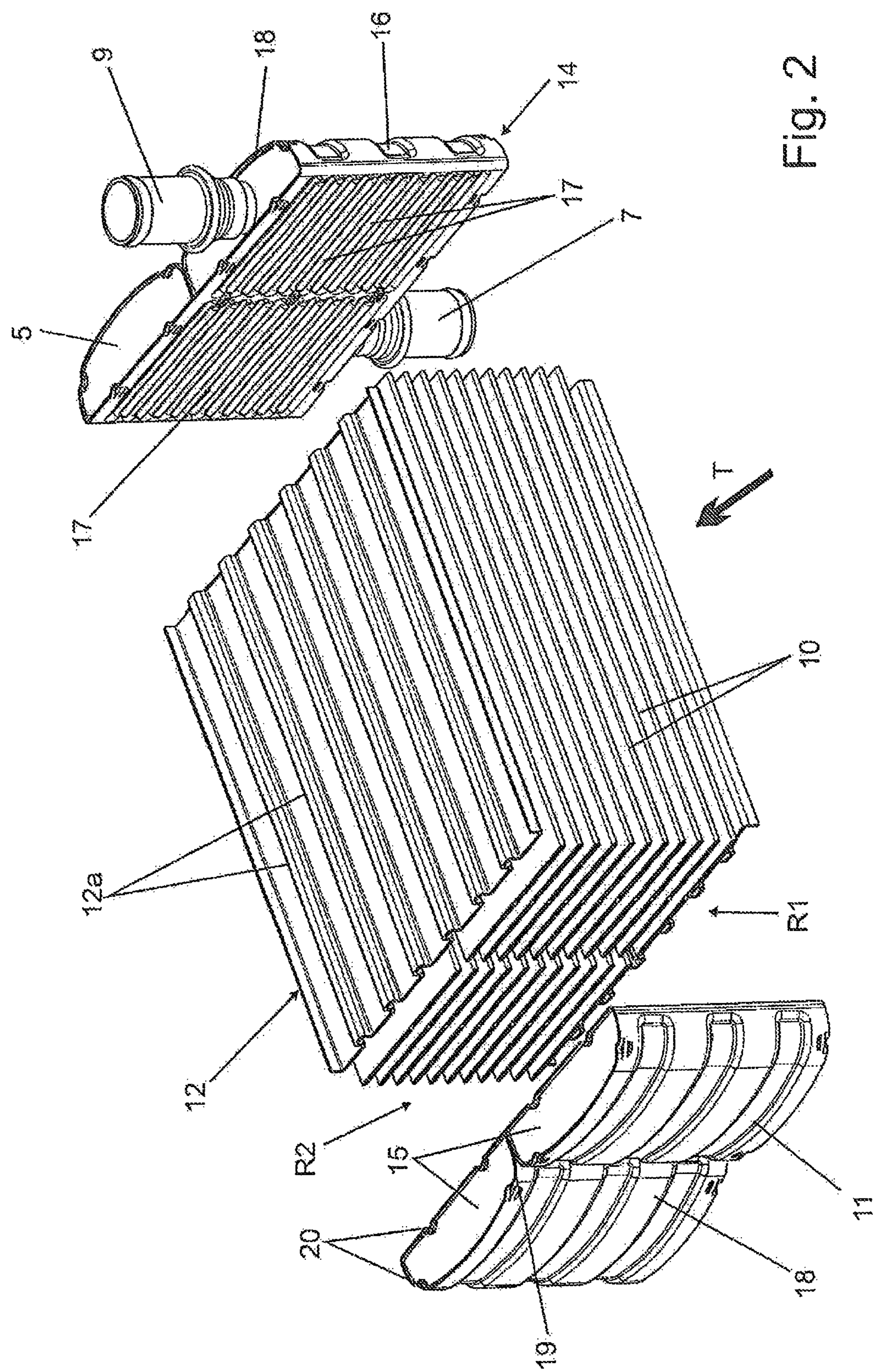
FIG. 2 shows an exploded three-dimensional view of the charge air cooler from FIG. 1.

In accordance with the exploded view in FIG. 2, the charge air cooler 5 comprises a stack of, in the present case, two rows of separate flat tubes 10, which are arranged sequentially in a depth direction T or a direction of the charge air flow. In the present case, the flat tubes extend in the horizontal plane. The coolant, for example engine coolant of a low-temperature coolant circuit, flows through the two rows R1, R2 of flat tubes in opposite directions. As FIG. 2 shows, the coolant, which enters through the bottom coolant connection 7, first flows in the row R2, which is to the rear in the air flow direction, is then redirected by 180° in a header 11, and flows through the front row R1 of flat tubes 10 in the direction opposite the rear row R2. With regard to the air flow, flow through the rows R1, R2 takes place first through R1 and then through R2, which is to say in the counterflow method.

Figure 4:
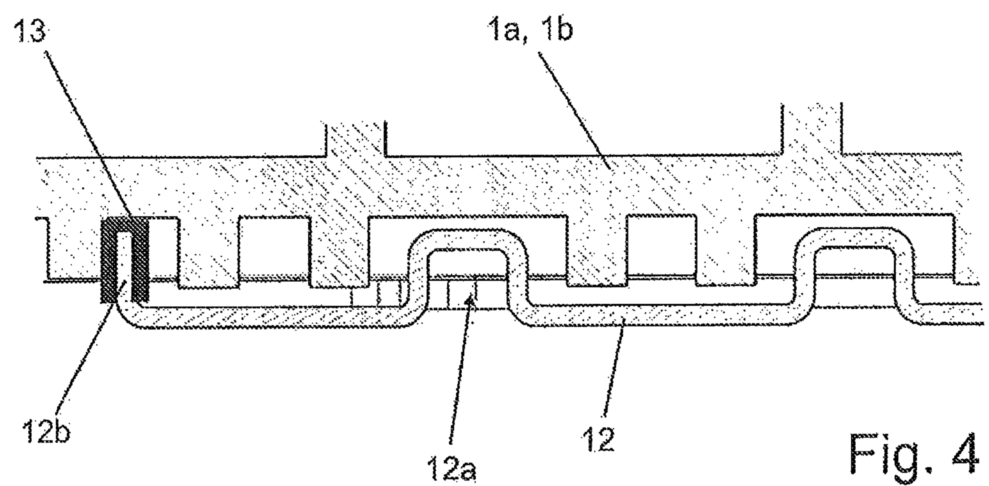
FIG. 4 shows a partial cross-section of the charge air cooler from FIG. 1.

Layers of ribs which are not shown are provided in each case between the stacked flat tubes 10, wherein the ribs are continuous over both rows R1, R2. Located at each end of the stack of flat tubes 10 are side parts 12 that have multiple corrugation-like ribs 12*a*, so that the side parts 12 can be formed from a metal sheet in a simple manner. Together with corresponding rib-shaped formations in the opposite side surfaces of the housing parts 1*a*, 1*b*, the ribs 12*a* form a labyrinth seal; see in particular the detail representation in FIG. 4. As a result of the multiple overlaps, good sealing of the charge air flow with respect to leakage flows between the charge air cooler 5 and housing parts 1*a*, 1*b* is achieved with simple means, and a leakage flow along the top and bottom side surfaces is avoided. Depending on requirements, an elastomer seal 13 can also be provided in addition, which in the representation in FIG. 4 is placed on an upward-bent, terminal edge 12*b* of the side part 12 as an elongated profile.

The redirecting header 11 that is located on the end, and a header 14 on the inlet side, are made in the same construction style from a formed sheet metal part 16 and four side cover parts 15. The formed sheet metal part 16 is provided in a center section or base part with two rows of feed-throughs 17 to accommodate the ends of the flat tubes 10, after which lateral overhangs are folded over to form an outer header wall 18 divided into two parts. The ends of the formed sheet metal part meet in a separating region 19 between the two parts of the header wall 18. In the case of the redirecting header 11, openings (not shown) for the coolant to flow through are provided in this separating wall 19. In the case of the header 14 on the inlet side, the separating wall 19 is made without openings, so that one half of the header 14 is used for the intake of the fluid and the other half of the header 14 is used for the discharge of the fluid. Overall, the charge air cooler is thus designed as a U-flow cooler with regard to the coolant flow.

The headers 11, 14 are each completed by four cover parts 15, which are mechanically held in tabs 20 at the edge of the sheet metal part 16 for fixturing. In a variant that is not shown, it is possible to provide only two cover parts per header 11, 14. On the inlet-side of header 14, a profiled fitting 7 is placed in an opening on one of the bottom cover parts 15, and a fitting 9 that is likewise profiled is placed on a top cover part 15. The fittings 7, 9 constitute coolant connections, wherein the bottom fitting 7 is used for the intake of the coolant and the top fitting 9 is used for the discharge of the coolant.

In an alternative embodiment that is not shown, the fittings 7, 9 can also be put in place after the soldering procedure as separate parts, for example plastic parts, by means of threaded fittings, clips, adhesives or other means.

Figure 3:
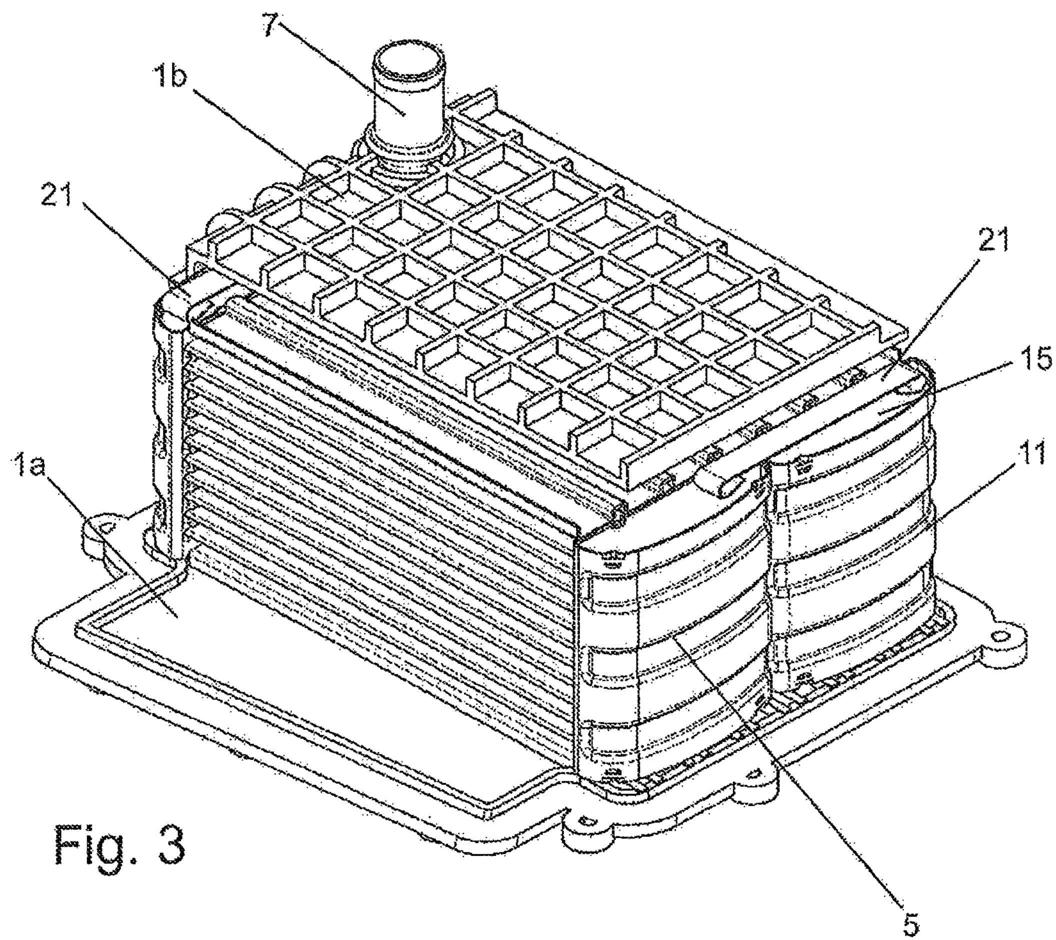
FIG. 3 shows a partially cut away, inverted three-dimensional view of the charge air cooler from FIG. 1.

In a preferred detail design of the exemplary embodiment from FIG. 3, the charge air cooler 5 is elastically supported on the bottom housing part 1*a* by means of a spring member in the form of two spring plates 21. The spring plates 21 are designed in the form of sheet metal strips with curved ends, wherein the curved ends each rest against one of the cover parts 15 of the headers 11, 14. A slight elastic mobility of the charge air cooler 5 relative to the housing 1 is provided by the spring member 21, so that vibrations of the housing 1 are damped with respect to the charge air cooler 5, and thermal expansions of the housing 1 and charge air cooler 5 are compensated. In useful fashion for this purpose, sufficient elastic sealing component (not shown) with respect to the feed-throughs 6, 8 in the housing parts 1*a*, 1*b* are provided on the coolant connections 7, 9.

Figure 5:
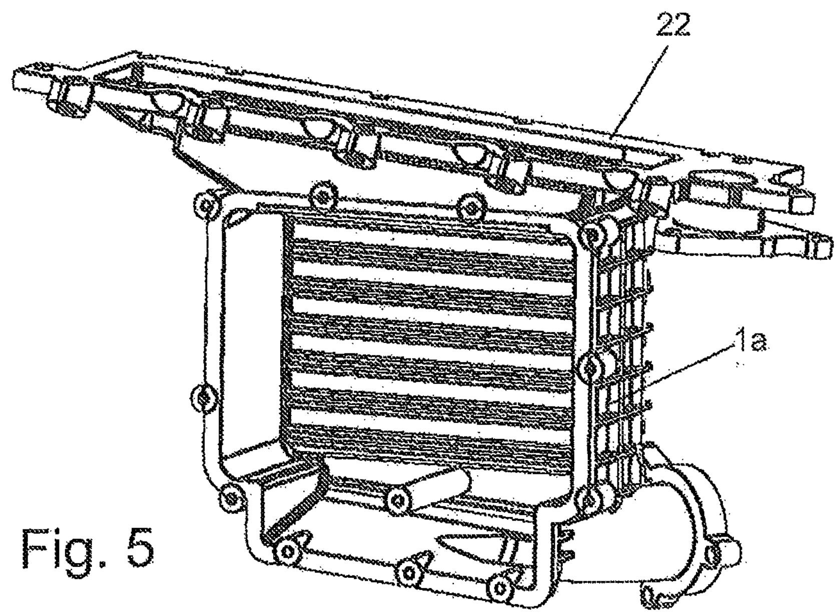
FIG. 5 shows a first variant of a housing part of the intake manifold from FIG. 1 with adjoining engine flange.
Figure 6:
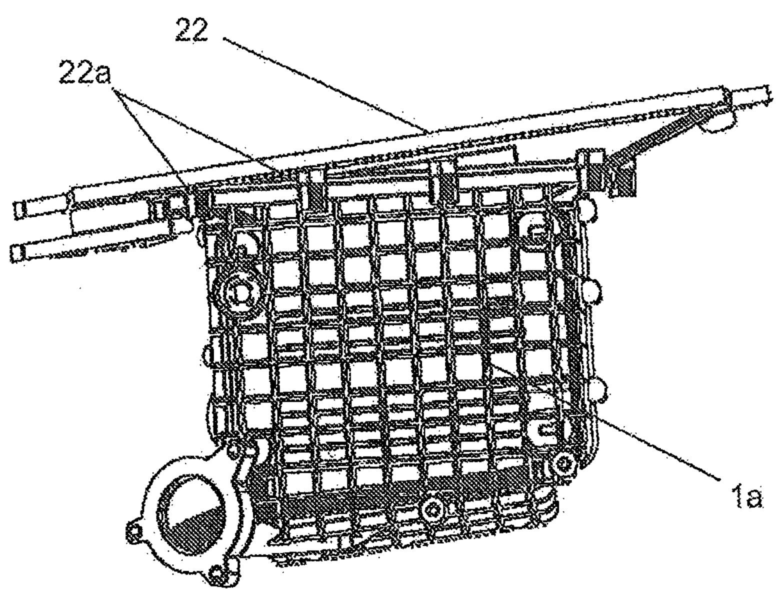
FIG. 6 shows a second variant of the housing part from FIG. 5 with adjoining engine flange.

FIG. 5 and FIG. 6 show two embodiments, in each of which an engine flange 22 for screwing the intake manifold from FIG. 1 to the cylinder head of an internal combustion engine is provided at the bottom housing part 1*a* at its outlet-side opening 3.

In the example from FIG. 5, the engine flange 22, as well as the housing part 1 a, is made of plastic, with the engine flange 22 and the housing part 1 a being friction welded to one another. Consequently, they form a one-piece plastic component composed of a uniform material.

In the example from FIG. 6, the engine flange 22 is made of aluminum, wherein it is screwed by means of threaded fittings 22*a* to the housing part 1*a*, which is made of plastic like the housing part in FIG. 5. In a variation that is not shown, it is also possible for both the engine flange 22 and the housing 1 to be made of a light metal such as aluminum. Manufacture from aluminum is desirable in the case of especially high charge pressures or also in the case of high local temperatures, for example in conjunction with a high pressure exhaust gas recirculation system. Insofar as pressures and temperatures allow forming from plastic, this is frequently, but not necessarily, desirable for reasons of cost and weight. Depending on requirements, the housing parts 1*a*, 1*b* also may be made of different materials, such as aluminum and plastic.

In the most general sense, charge air within the meaning of the invention is understood to mean the gas supplied to the internal combustion engine, and in this sense also includes any desired mixtures of air and exhaust gas if exhaust gas recirculation is provided. The intake manifold in accordance with the invention can be combined with diesel engines as well as with gasoline engines.

Figure 7:
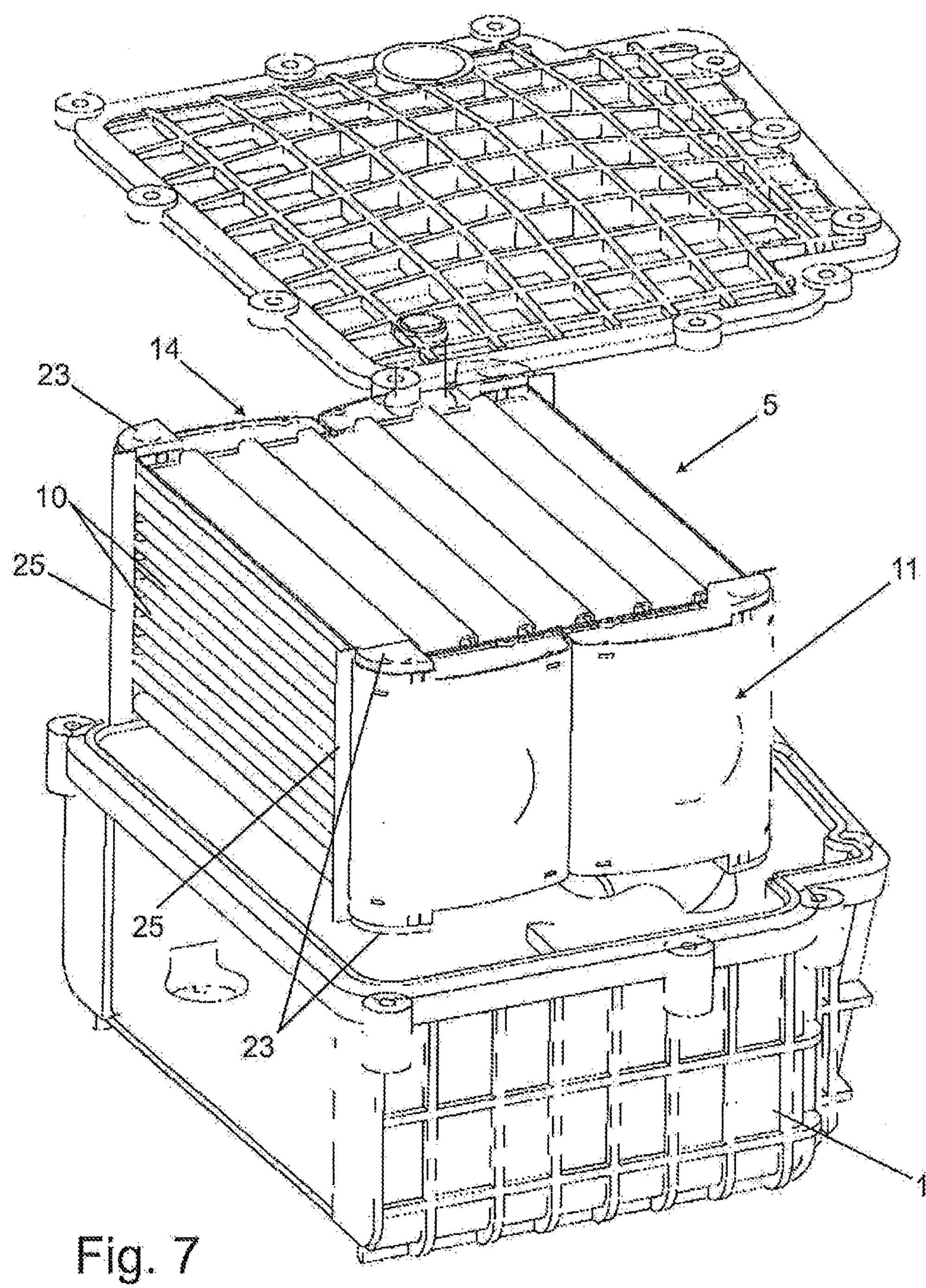
FIG. 7 shows a three-dimensional view of a variant of the intake manifold from FIG. 1 with installed support members.
Figure 8:
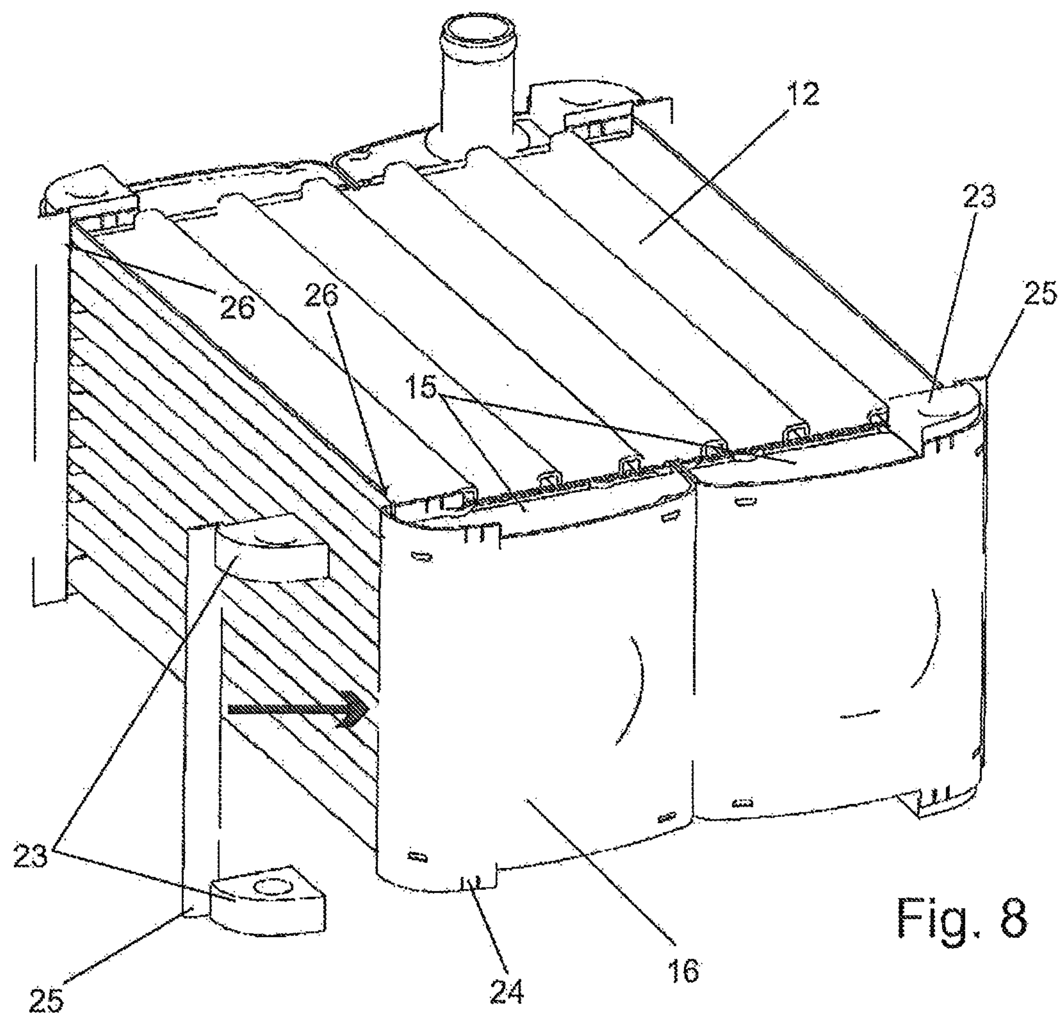
FIG. 8 shows a three-dimensional view of the charge air cooler from FIG. 3.
Figure 9:
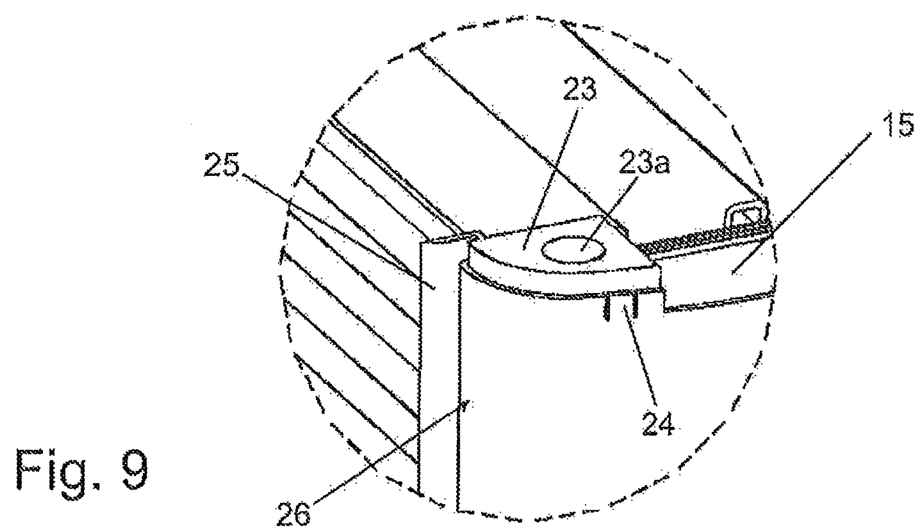
FIG. 9 shows an enlarged cutaway view of the charge air cooler from FIG. 4 in the region of a header.

In the additional exemplary embodiment shown in FIG. 7 to FIG. 9, the charge air cooler 5 is supported with respect to the housing 1 by means of elastic support members 23. The support members, eight in all, are molded as prismatic blocks from an elastic material such as rubber, and they each have bores or recesses 23*a* on the top by means of which they are better secured to the housing 1.

The support members 23 have the cross-section of a right triangle with a curved hypotenuse. They each rest on the side cover pieces 15 of the headers and are fastened in a clamping manner by means of a flexible tab 24 that is provided in a projecting edge of the formed sheet metal part 16.

Each pair of support members 23 located on opposite side parts 15 of a header constitutes a structural unit together with a coupling link 25, or is joined together by the coupling link 25.

The coupling link 25 includes a sealing member formed as an elongated sealing lip that runs along an edge of the header and creates a seal between the housing 1 and the charge air cooler 5, by which means leakage flows of the charge air are avoided. FIG. 8 shows one of the units composed of support members 23 and coupling link 25 during the process of installation (direction of arrow). The unit [can] be manufactured as a one-piece molded part of a single material, or can also have multiple assembled components.

Another difference from the first exemplary embodiment in FIG. 1 resides in the shape of the headers 11, 14. These each have an overhang 26 in the flow direction of the charge air by which they project past an inlet plane formed by the front edges of the flat tubes 10 and an outlet plane formed by the back edges of the flat tubes 10 of the cooler network of flat tubes and ribs.

In the present case, this overhang 26 serves as a support for contact of the coupling link 25 formed as a sealing lip. In alternative embodiments, a separate sealing member can also be arranged on the overhang 26 and/or the overhang forms a labyrinth seal together with a suitable form of the housing that encompasses the overhang.

It is a matter of course that the individual features of the different exemplary embodiments may be appropriately combined with one another as required.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An intake manifold having an integrated charge air cooler, comprising:

an inlet;

an outlet; and a housing having a first housing part and a second housing part connected thereto, wherein charge air flows into the housing via the inlet and flows out of the housing via the outlet, wherein the charge air cooler is arranged in the housing and the charge air passes through the charge air cooler on the way from the inlet to the outlet, wherein the charge air cooler is fully enclosed by the housing except for feed-throughs for passage of a coolant and the charge air cooler is elastically supported with respect to the housing, and wherein the support takes place via at least one elastic support member that is arranged on a header of the charge air cooler, such that the at least one elastic support member directly contacts the header.

2. The intake manifold according to claim 1, wherein the charge air cooler has essentially a shape of a cuboid, and wherein the charge air cooler is insertable in one of the housing parts substantially perpendicular to a largest side surface of the cuboid.

3. The intake manifold according to claim 1, wherein the charge air cooler is configured as a tube heat exchanger with a stack of flat tubes, and wherein the coolant flows through the flat tubes and the charge air flows around them.

4. The intake manifold according to claim 3, wherein one header is located at each end of the flat tubes, wherein the flat tubes and the headers are manufactured as a soldered block from metal, in particular aluminum.

5. The intake manifold according to claim 4, wherein at least one of the headers has a base region and a header wall that are produced together as one piece from a formed sheet metal part.

6. The intake manifold according to claim 3, wherein the tube bundle includes at least two rows of tubes in a depth direction, wherein the rows of tubes include either separate flat tubes or a one-piece flat tube with separate flow passages.

7. The intake manifold according to claim 6, wherein the coolant flows through the rows of tubes sequentially in opposite directions, in particular in a counterflow configuration with regard to the direction of flow of the charge air.

8. The intake manifold according to claim 1, wherein at least one side part is arranged on the charge air cooler, and wherein the side part has a structuring for producing a labyrinth seal with respect to an inside wall of the housing.

9. The intake manifold according to claim 1, wherein at least two support members are connectable to one another via a coupling link, and wherein the coupling link has a sealing member to seal the charge air cooler with respect to the housing.

10. The intake manifold according to claim 1, wherein a header of the charge air cooler has an overhang extending in a flow direction of the charge air beyond an inlet plane or outlet plane of a cooler network.

11. The intake manifold according to claim 1, wherein the housing is made of a plastic or a light metal.

12. The intake manifold according to claim 1, wherein an engine flange for attachment to an intake region of a cylinder head is provided at the outlet, and wherein the engine flange is made of plastic or a light metal.

13. The intake manifold according to claim 1, wherein a coolant connection of the charge air cooler is elastically sealed in an airtight manner to the housing in a region of feed-throughs.

14. The intake manifold according to claim 1, wherein at least one coolant connection of the charge air cooler is joined material-to-material with the charge air cooler via soldering and/or wherein at least one coolant connection of the charge air cooler is joined in an interlocking manner with the charge air cooler via threaded fittings and/or clips.

15. The intake manifold according to claim 1, wherein at least one coolant connection of the charge air cooler is provided on a top side of the charge air cooler with respect to gravity.

16. The intake manifold according to claim 1, wherein the at least one elastic support member directly contacts at least one header of the charge air cooler.

17. An intake manifold having an integrated charge air cooler, comprising:

an inlet;

an outlet; and a housing having a first housing part and a second housing part connected thereto, wherein charge air flows into the housing via the inlet and flows out of the housing via the outlet, wherein the charge air cooler is arranged in the housing and the charge air passes through the charge air cooler on the way from the inlet to the outlet, wherein the charge air cooler is fully enclosed by the housing except for feed-throughs for passage of a coolant and the charge air cooler is elastically supported with respect to the housing, wherein the support takes place via at least one elastic support member that is arranged on a header of the charge air cooler, and wherein the at least one elastic support member is a spring plate having curved ends that contact the at least one header of the charge air cooler.

18. An intake manifold having an integrated charge air cooler, comprising:

an inlet;

an outlet; and a housing having a first housing part and a second housing part connected thereto, wherein charge air flows into the housing via the inlet and flows out of the housing via the outlet, wherein the charge air cooler is arranged in the housing and the charge air passes through the charge air cooler on the way from the inlet to the outlet, wherein the charge air cooler is fully enclosed by the housing except for feed-throughs for passage of a coolant and the charge air cooler is elastically supported with respect to the housing, wherein the support takes place via at least one elastic support member that is arranged on a header of the charge air cooler, wherein at least two support members are connectable to one another via a coupling link, and wherein the coupling link has a sealing member to seal the charge air cooler with respect to the housing, and wherein each of the at least two support members are formed as a rubber block, the at least two support members respectively contacting opposing surfaces of the at least one header of the charge air cooler.

19. An intake manifold having an integrated charge air cooler, comprising:

an inlet;

an outlet; and a housing having a first housing part and a second housing part connected thereto, wherein charge air flows into the housing via the inlet and flows out of the housing via the outlet, wherein the charge air cooler is arranged in the housing and the charge air passes through the charge air cooler on the way from the inlet to the outlet, wherein the charge air cooler is fully enclosed by the housing except for feed-throughs for passage of a coolant and the charge air cooler is elastically supported with respect to the housing, wherein the support takes place via at least one elastic support member that is arranged on a header of the charge air cooler, wherein a header of the charge air cooler has an overhang extending in a flow direction of the charge air beyond an inlet plane or outlet plane of a cooler network, and wherein the at least one elastic support member contacts the overhang.

20. An intake manifold having an integrated charge air cooler, comprising:

an inlet;

an outlet; and a housing having a first housing part and a second housing part connected thereto, wherein charge air flows into the housing via the inlet and flows out of the housing via the outlet, wherein the charge air cooler is arranged in the housing and the charge air passes through the charge air cooler on the way from the inlet to the outlet, wherein the charge air cooler is fully enclosed by the housing except for feed-throughs for passage of a coolant and the charge air cooler is elastically supported with respect to the housing, wherein the support takes place via at least one elastic support member that is arranged on a header of the charge air cooler, wherein at least one side part is arranged on the charge air cooler, and wherein the side part has a structuring for producing a labyrinth seal with respect to an inside wall of the housing, and wherein the at least one side part has a plurality of ribs that form the labyrinth seal.

* * * * *